US006878325B2

United States Patent
Drake

(10) Patent No.: US 6,878,325 B2
(45) Date of Patent: Apr. 12, 2005

(54) METHOD OF MANUFACTURING A DECORATIVE COVER FOR A LAMP POST

(75) Inventor: Stephen D. Drake, Brighton, CO (US)

(73) Assignee: W.J. Whatley, Inc., Henderson, CO (US)

( * ) Notice: Subject to any disclaimer, the term of this patent is extended or adjusted under 35 U.S.C. 154(b) by 0 days.

(21) Appl. No.: 10/228,934

(22) Filed: Aug. 27, 2002

(65) Prior Publication Data

US 2003/0219560 A1 Nov. 27, 2003

Related U.S. Application Data

(60) Provisional application No. 60/382,383, filed on May 22, 2002, now abandoned.

(51) Int. Cl.[7] ........................... B29C 41/06; B29C 41/22
(52) U.S. Cl. ....................... 264/154; 264/250; 264/308; 264/310; 264/311
(58) Field of Search ................................. 264/138, 154, 264/159, 250, 260, 271.1, 299, 306, 308, 309, 310, 311, 312, 259; 29/428, 525

(56) References Cited

U.S. PATENT DOCUMENTS

| | | | |
|---|---|---|---|
| 4,104,357 A | 8/1978 | Blair | |
| 4,183,883 A | 1/1980 | Blair | |
| 4,416,841 A * | 11/1983 | Corea et al. | ................. 264/102 |
| 4,892,601 A | 1/1990 | Norwood | |
| 4,923,541 A | 5/1990 | Burger | |
| 5,294,151 A | 3/1994 | Goode | |
| 5,326,410 A | 7/1994 | Boyles | |
| 5,503,780 A * | 4/1996 | Payne | ........................ 264/1.24 |
| RE35,322 E | 9/1996 | Owen et al. | |
| 5,656,231 A | 8/1997 | Blackmore | |
| 5,705,200 A * | 1/1998 | Payne | ......................... 425/4 R |
| 5,795,524 A | 8/1998 | Basso et al. | |
| 6,060,006 A | 5/2000 | Savenok | |
| 6,080,257 A * | 6/2000 | Magoffin | .................... 156/167 |
| 6,102,611 A | 8/2000 | Roller | |
| 6,244,781 B1 | 6/2001 | Roller | |
| 6,500,375 B1 * | 12/2002 | Aulick et al. | ............... 264/236 |
| 2001/0012473 A1 | 8/2001 | Roller | |
| 2002/0025221 A1 | 2/2002 | Johnson | |

* cited by examiner

*Primary Examiner*—Angela Ortiz
(74) *Attorney, Agent, or Firm*—Michael Best & Friedrich LLP

(57) ABSTRACT

A decorative cover for a post having a hollow body. The hollow body includes a continuous wall having a substantially uniform thickness, and a cavity having at least one undercut that would prevent a core from being pulled from the cavity. The decorative post can be manufactured by providing a mold, introducing a liquid thermosetting resin within the mold, rotating the mold about first and second axes, curing the liquid thermosetting resin as the mold is rotated to form a body with a substantially uniform wall thickness, and removing the cured liquid thermosetting resin from the mold.

16 Claims, 2 Drawing Sheets

METHOD OF MANUFACTURING A DECORATIVE COVER FOR A LAMP POST

This application claims the benefit of prior filed provisional patent application No. 60/382,383 filed on May 22, 2002 now abandoned.

FIELD OF THE INVENTION

The invention relates to composite covers, and, more particularly, to composite covers for light poles.

BACKGROUND OF THE INVENTION

Covers for light poles, traffic signal poles, street sign poles, bollards, or utility poles have been used for many decades to add a decorative base to a light pole, or to hide and protect an access hole to wiring splices or fuses in the pole. Traditionally, these covers were made of cast iron and formed by statically pouring molten iron into sand molds. This process includes breaking out sand molds, finishing and painting the covers, and installing the covers onto the poles.

The cast iron covers are disadvantageous because they are heavy, expensive, brittle, corrosive in urban environments, and electrically conductive. More specifically, the cast iron covers present a shock hazard and are subject to galvanic corrosion. In addition, many of the foundries are no longer in business, and the original patterns for production have been lost. Other alternative covers are made of cast aluminum and cast concrete, both of which have several of the same drawbacks of the original cast iron covers.

In recent years, covers duplicating the old cast iron covers have been manufactured from fiberglass and polyester resin using traditional techniques such as hand lay-up or spray-chopped. These covers are light, non-corrosive, aesthetically pleasing, and inexpensive. In addition, they are less likely to cause damage or injury when hit by vehicles compared to the traditional covers.

Even more recently, covers have been manufactured by pouring a urethane into a mold, allowing it to cure, and removing the part. These covers possess the advantages associated with the fiberglass covers, and the urethane covers are more impact resistant and less expensive to produce.

To form a poured urethane (or resin injection molded) cover, a core is placed into a mold, and the urethane is poured or injected into the cavity formed by the outer mold and the core. After the urethane is polymerized, the core is extracted and the mold opened to remove the cover.

The disadvantage of the poured urethane method is that many of the more decorative covers have large undercuts, which prevent a core from being removed after molding. As a result, the wall thickness is much thicker than necessary in the undercut areas. These large variations in wall thickness increases the production cost and reduces the structural integrity of the cover. Since the cost of urethane is higher than the material cost of fiberglass, the cost advantages of lower labor costs for urethane covers is largely offset by the higher material costs. It would be commercially important if a urethane cover could be molded with a relatively constant wall thickness, thus minimizing both the material and labor costs. The described invention produces a uniform and stable wall section, with low labor cost.

SUMMARY OF THE INVENTION

One embodiment of the present invention is directed to a method of manufacturing a decorative cover for a post. The method including providing a mold, introducing a liquid thermosetting resin within the mold, rotating the mold about first and second axes, curing the liquid thermosetting resin as the mold is rotated to form a body with a substantially uniform wall thickness, and removing the cured liquid thermosetting resin from the mold.

Another embodiment of the invention is directed to a decorative cover for a post having a hollow body. The hollow body includes a continuous wall having a substantially uniform thickness, and a cavity having at least one undercut that would prevent a core from being pulled from the cavity.

Other features and advantages of the invention will become apparent to those skilled in the art upon review of the following detailed description, claims, and drawings.

Figure 1:
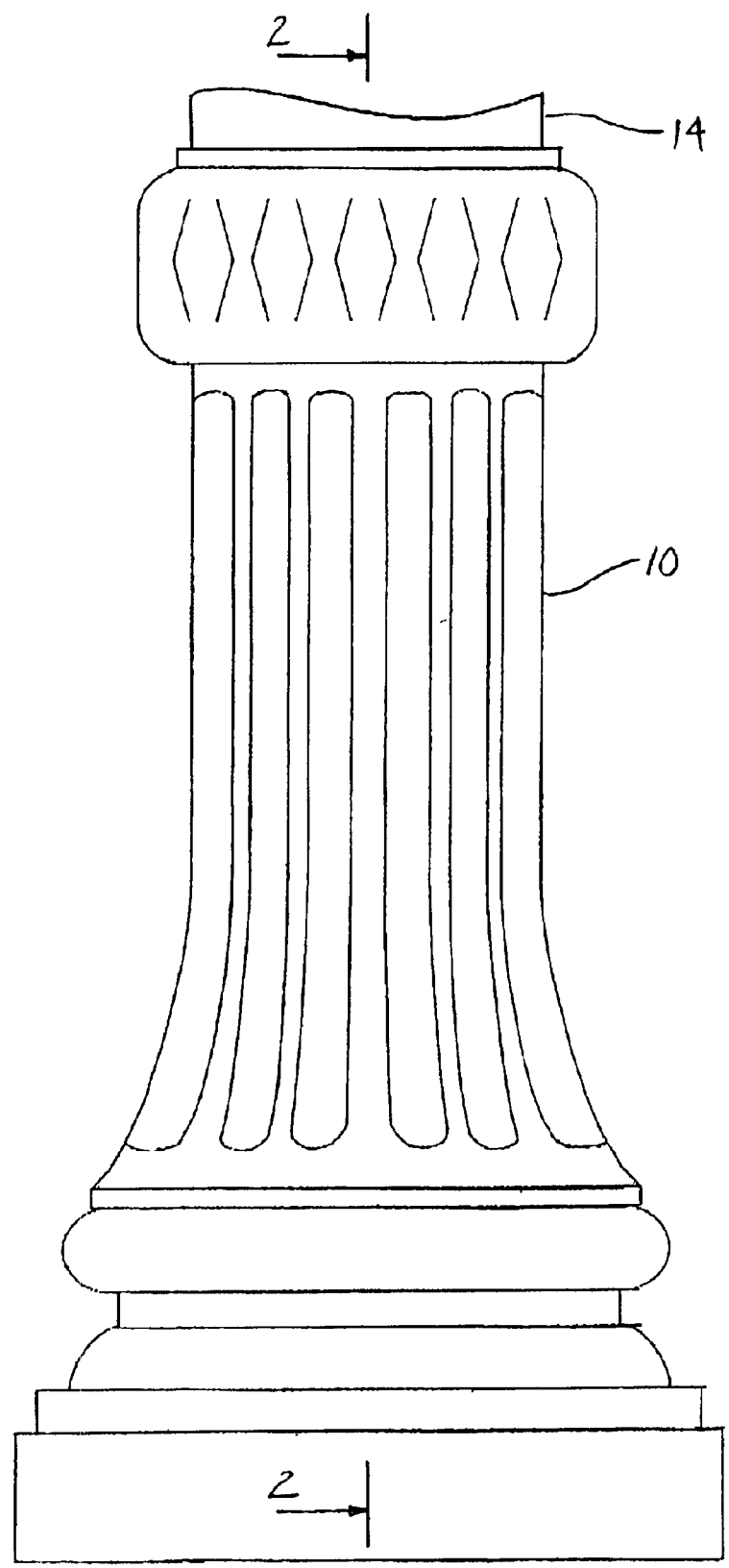
FIG. 1 is a front view of a decorative base cover according to one embodiment of the present invention.
Figure 2:
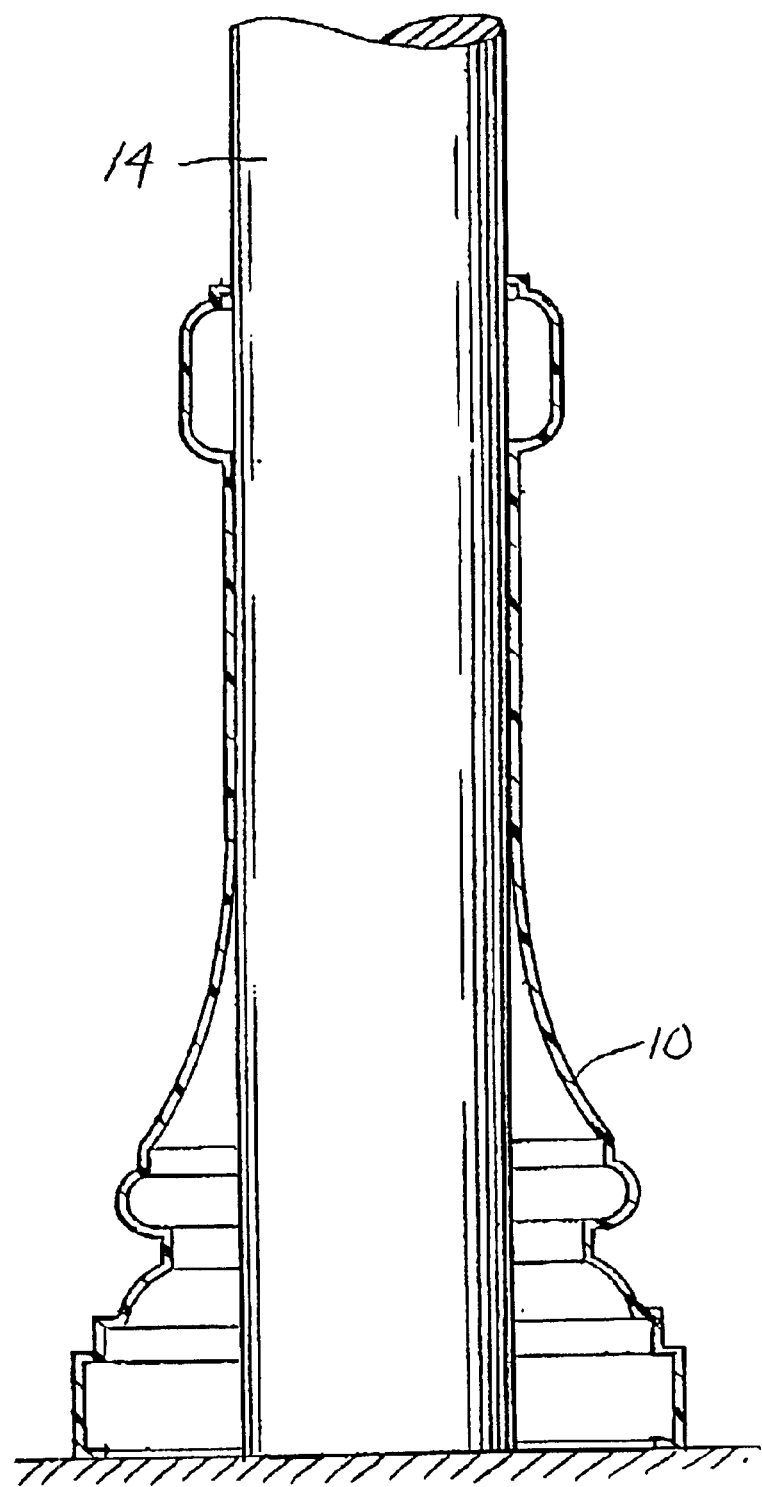
FIG. 2 is a partial cross-section view taken along line 2—2 of FIG. 1, illustrating the substantially uniform thickness of the decorator cover.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

FIG. 1 illustrates a decorative cover 10 according to one embodiment of the present invention covering a light pole 14. The method of manufacturing the cover 10 is described in more detail below.

A female mold is formed by conventional means, such as from composite materials or metals. In the case of composites, a pattern of the desired base cover may be made from materials such as clay, wood, plaster and the like (or from an antique cast iron base cover). The pattern is then overlaid with composite materials such as a gel coat and fiber reinforced resin such as epoxy or polyester. Alternatively, the pattern may be overlaid with silicone rubber reinforced with composite materials. This forms an impression of the outside of the desired cover.

In the disclosed invention, the mold is made in two halves which are registered together so that seams and mold mismatch are minimized. After joining the halves together, caps are fitted on both ends, thus forming a closed mold without any core. One of the closed ends has a removable stopper with a vent tube in it, through which a thermosetting liquid monomer such as urethane or unsaturated polyester may be introduced. More specifically, the liquid monomer can be dicyclopentadiene. The liquid monomer can additionally have reinforcement such as short chopped fiberglass, or other property improving materials for specific applications such as static reduction and electrostatic finish application, or fillers such as calcium carbonate or glass micro balloons. The liquid may also be pigmented to match the desired final color. In this case, paint damage to the exterior paint would tend to be hidden by the color of the molded part, which may be pigmented all the way through the wall of the cover 10.

To produce the cover 10, the joined mold is placed into a rotational molding machine, which is designed to rotate about two axes simultaneously. The liquid material is poured into the mold through the hole in one end, the stopper is inserted, and the machine is rotated. After the material has at least partially polymerized, the mold may be opened, and the cover 10 removed. The process maybe done at room temperature, since the resins are liquid, or may be done at elevated temperature to speed up the polymerization.

Additionally, the cover 10 may be built up in stages with polymerizing between stages. For example, the first layer may be a different material than subsequent materials. The first layer may be a material with excellent weathering properties, while the next layer may have improved structural properties, such as obtained with fiber reinforcement. In this case, the first layer would be allowed to at least partially solidify, then a second layer would be added and rotated again with the rotational molding machine.

After removal from the mold, the top and bottom of the cover 10 is cut out to accept the diameter of the pole 14 for which it is made. The cover 10 can be optionally painted through conventional means.

Through this means, a one-piece cover 10 is produced which slips over a light pole 14 before the lighting fixture is attached. This prevents the cover 10 from being stolen or otherwise removed without removing the light fixture. Since there is also a demand for two-piece covers for replacement purposes, the cover 10 may also be made in halves either by splitting the one-piece cover 10 and attaching fasteners, or rotational molding it in separate halves.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of manufacturing a decorative cover for a lamp post comprising:
   providing a mold with an inner surface substantially resembling a decorative cover of a lamp post;
   introducing a thermosetting resin within the mold;
   rotating the mold to disperse the thermosetting resin substantially equally across the inner surface of the mold;
   curing the thermosetting resin as the mold is rotated to form a body with a substantially uniform wall thickness and with an outer surface substantially resembling a decorative cover for a lamp post;
   removing the cured thermosetting resin from the mold;
   cutting holes in the top and bottom of the cured thermosetting resin to receive the lamp post within the cured thermosetting resin;
   covering only the base of the lamp post with the cured thermosetting resin;
   defining a hollow cavity between the cured thermosetting resin and the lamp post when the lamp post is received within the cured thermosetting resin; and
   maintaining the hollow cavity unfilled.

2. The method of claim 1, wherein introducing a thermosetting resin includes introducing a urethane resin.

3. The method of claim 1, wherein introducing a thermosetting resin includes introducing a dicyclopentadiene resin.

4. The method of claim 1, further comprising placing the mold in a rotational molding machine.

5. The method of claim 1, further comprising introducing an additional thermosetting resin to the mold after the thermosetting resin is at least partially cured.

6. The method of claim 1, wherein rotating the mold includes rotating the mold about first and second axes.

7. The method of claim 1, further comprising separating the cured thermosetting resin into at least two portions.

8. The method of claim 1, further comprising adding pigmentation to the thermosetting resin.

9. The method of claim 1, further comprising adding a filler to the thermosetting resin to modify the properties of the cured thermosetting resin.

10. The method of claim 9, wherein adding a filler includes adding calcium carbonate.

11. The method of claim 10, wherein adding a filler includes adding glass micro-balloons.

12. A method of manufacturing a decorative cover for a lamp post comprising:
    providing a lamp post;
    providing a mold with an inner surface substantially resembling a decorative cover of a lamp post;
    introducing a thermosetting resin within the mold;
    rotating the mold to disperse the thermosetting resin substantially equally across the inner surface of the mold;
    curing the thermosetting resin as the mold is rotated to form a body with a substantially uniform wall thickness and with an outer surface substantially resembling a decorative cover for a lamp post;
    removing the cured thermosetting resin from the mold;
    cutting holes in the top and bottom of the cured thermosetting resin to receive the lamp post within the cured thermosetting resin;
    positioning the cured thermosetting resin on the lamp post;
    covering only the base of the lamp post with the cured thermosetting resin;
    defining a hollow cavity between the cured thermosetting resin and the lamp post when the cured thermosetting resin is positioned on the lamp post; and
    maintaining the hollow cavity unfilled.

13. The method of claim 1, further comprising:
    partially solidifying the thermosetting resin;
    introducing an additional thermosetting resin within the mold;
    rotating the mold to disperse the additional thermosetting resin substantially equally across an inner surface of the partially solidified thermosetting resin; and curing the additional thermosetting resin as the mold is rotated to form a body with a substantially uniform wall thickness;

wherein removing the cured thermosetting resin from the mold includes removing the cured thermosetting resin and the cured additional thermosetting resin from the mold, and wherein cutting holes in the top and bottom of the cured thermosetting resin includes cutting holes in the top and bottom of the cured thermosetting resin and the cured additional thermosetting resin to receive the lamp post within the cured thermosetting resin and the additional thermosetting resin.

14. The method of claim 13, wherein the cured thermosetting resin and the additional cured thermosetting resin have different properties.

15. The method of claim 14, wherein the cured thermosetting resin has increased weathering properties and the additional thermosetting resin has increased structural properties.

16. A method of manufacturing a decorative cover for lamp post comprising:

providing a lamp post;

providing a mold with an inner surface substantially resembling a decorative cover of a lamp post;

introducing a first thermosetting resin within the mold;

rotating the mold to disperse the first thermosetting resin substantially equally across the inner surface of the mold;

curing the first thermosetting resin as the mold is rotated to form a body with a substantially uniform wall thickness and with an outer surface substantially resembling a decorative cover for a lamp post;

introducing a second thermosetting resin within the mold after the first thermosetting resin is at least partially solidified;

rotating the mold to disperse the second thermosetting resin substantially equally across an inner surface of the partially solidified first thermosetting resin;

curing the second thermosetting resin as the mold is rotated to form a body with a substantially uniform wall thickness;

removing the cured first and second thermosetting resins from the mold;

cutting holes in the top and bottom of the cured first and second thermosetting resins to receive the lamp post within the cured first and second thermosetting resins;

positioning the cured first and second thermosetting resins on the lamp post;

covering only the base of the lamp post with the cured first and second thermosetting resins;

defining a hollow cavity between the cured first and second thermosetting resins and the lamp post when the cured first and second thermosetting resins are positioned on the lamp post; and maintaining the hollow cavity unfilled.

* * * * *